Patented Jan. 2, 1923.

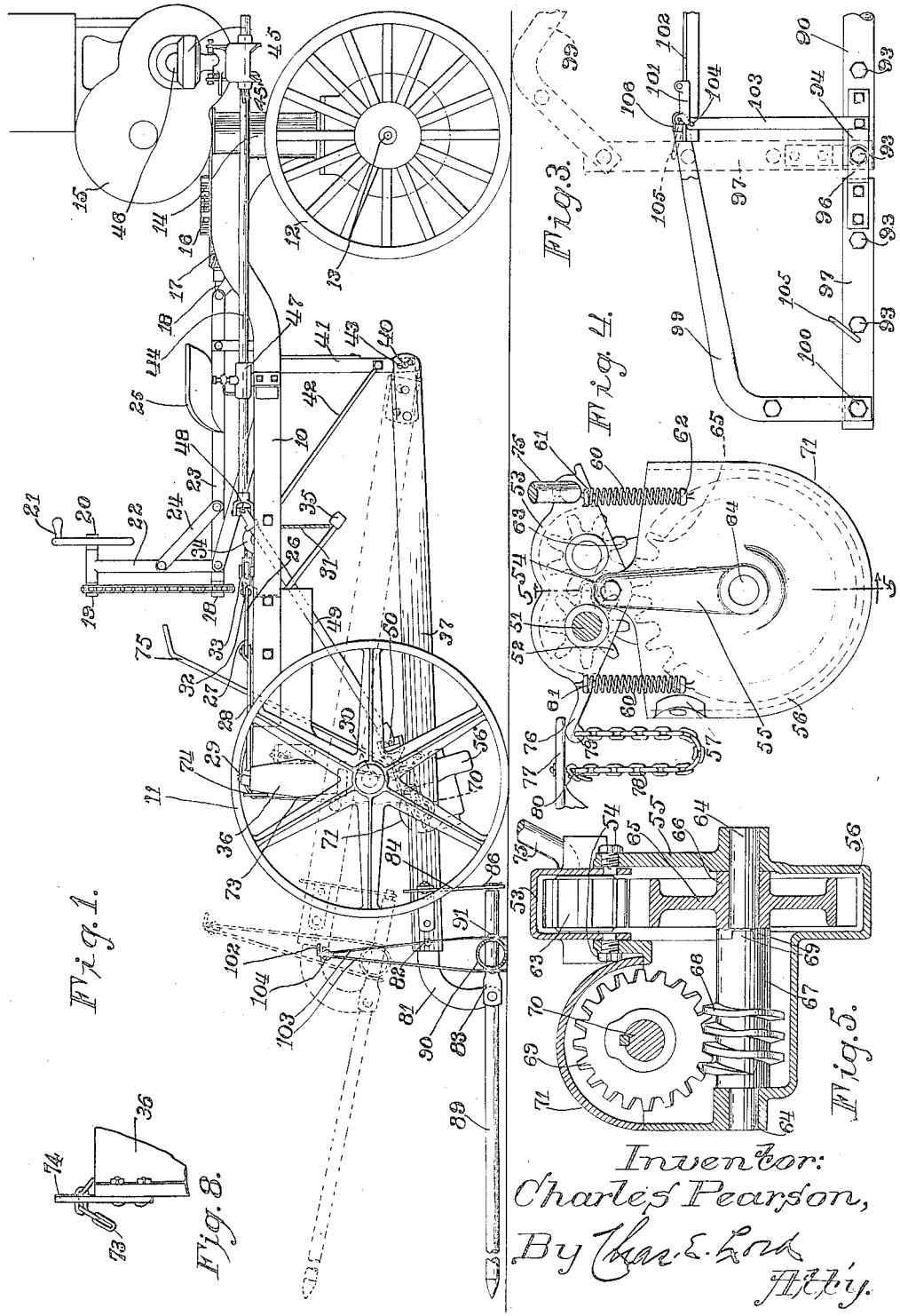

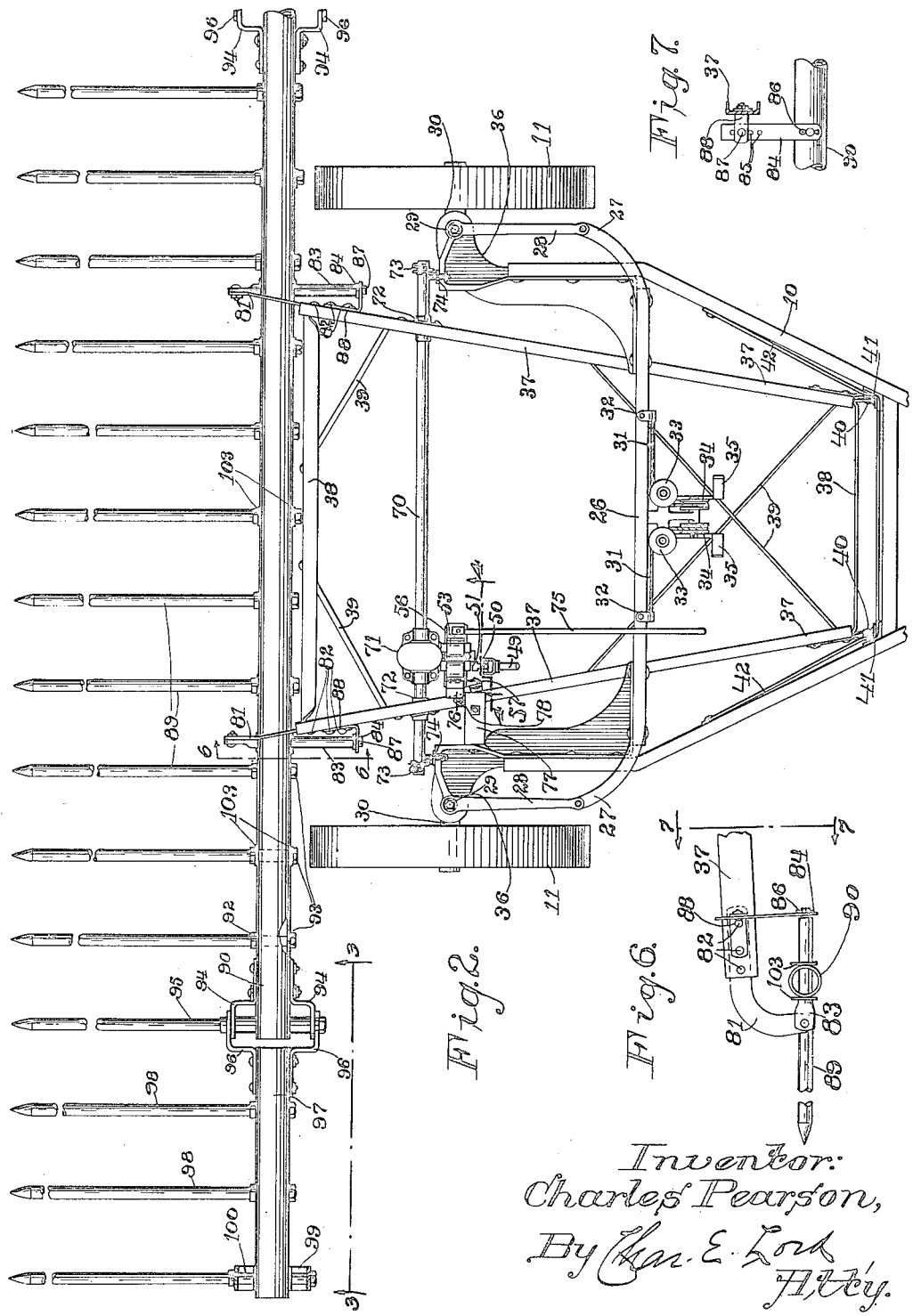

1,441,021

UNITED STATES PATENT OFFICE.

CHARLES PEARSON, OF CHICAGO, ILLINOIS, ASSIGNOR TO INTERNATIONAL HARVESTER COMPANY, A CORPORATION OF NEW JERSEY.

MOTOR-OPERATED IMPLEMENT.

Application filed June 9, 1919. Serial No. 302,862.

*To all whom it may concern:*

Be it known that I, CHARLES PEARSON, a citizen of the United States, residing at Chicago, in the county of Cook and State of Illinois, have invented certain new and useful Improvements in Motor-Operated Implements, of which the following is a full, clear, and exact specification.

This invention relates to harvesters, and more particularly to harvester attachments for motor propelled vehicles or tractors.

At the present time, when the use of tractors for propelling and operating farm implements is becoming more and more common, one of the problems that confronts farm implement manufacturers is how best to adapt their implements for tractor propulsion and operation.

It will be evident that the ease of connecting the machine to the tractor and of disconnecting therefrom is one important factor to be considered, and that the operation of the combined machines with the minimum amount of help, is another important factor. It is also advisable to eliminate as far as possible unnecessary parts of the harvester implement by supporting the implement on the frame of the tractor, as the elimination of such unnecessary parts cuts down the weight of the implement and thereby decreases the cost thereof and increases the efficiency of the combination of machines.

The present invention has been worked out with the above mentioned problems in mind and the invention has for its objects therefore; to adapt harvester implements for tractor propulsion and operation; to eliminate as far as possible unnecessary parts from the implement, thereby cutting down the weight; to provide for the adjustment of the harvester by means of power derived from the tractor motive power; to provide safety devices for throwing out of operation the power drive connections when the implement has been adjusted within certain fixed limits; to provide a supporting structure on the tractor and cooperating supporting members on the implement and means for relatively adjusting these parts so that the implement may be connected to the tractor with a minimum expenditure of manual labor, and to so combine the implement and tractor and to so locate the operative parts thereof, that all of the necessary adjustments such as steering adjustments, raising and lowering adjustments, etc., may be made from the operator's seat on the tractor.

With the above objects in view, and with the further objects which will appear as the description proceeds, I have worked out one practical embodiment of my invention, and in the drawings, wherein I have illustrated this practical embodiment, Fig. 1 is a side elevational view illustrating my combined implement and tractor;

Fig. 2 is a top plan view of the construction shown in Fig. 1;

Fig. 3 is a rear elevational view of an end portion of the frame of the implement as indicated by the line 3—3 on Fig. 2;

Fig. 4 is a rear elevational view of the raising and lowering mechanism looking in the direction of the arrows 4—4 Fig. 2;

Fig. 5 is a vertical sectional view of the raising and lowering mechanism taken on the line 5—5 of Fig. 4;

Fig. 6 is a detail view illustrating the connection between the raking tines and their supporting member and the frame of the tractor, the view being a section taken substantially on the line 6—6 of Fig. 2; and Fig. 7 is a rear elevation of Fig. 6 looking in the direction of the arrows 7—7.

Fig. 8 is an enlarged view of the chain supporting member of Fig. 1.

In the embodiment of my invention illustrated in the drawings, I have shown a shock gatherer or sweep rake combined with the tractor, but it should be understood that this particular form of implement has been shown merely for purposes of illustration and that the hinged frame, hereinafter described, which is connected to the tractor frame, may be used to support any other desired implement.

The tractor in connection with which my invention is illustrated, comprises a substantially triangular shaped frame 10, supported at its front end by wheels 11 which in addition to serving the function of supporting the frame, also act as steering wheels in a manner hereinafter described. The rear end of the frame is supported by a traction wheel 12, mounted upon a horizontal axle 13, the axle 13 being movable with the traction wheel about a vertical pivot 14. An engine 15, preferably of the internal combustion type, is mounted on the frame 10 substantially above the traction wheel 12 so that the weight of the engine gives added traction to the wheel 12. A toothed sector 16 is connected with the vertical pivot 14 and this sector is rotated by means of suitable gearing 17 operated by a shaft 18 which in turn is rotated by a chain and sprocket connection 19 with a shaft 20 carrying a hand wheel 21. The shaft 20 is supported in a vertical standard 22 carried by a frame member 23 and suitably braced with respect thereto by means of a member 24. The operator's seat 25 is mounted on the frame of the tractor and the operating levers for steering and adjusting the various parts of the device are located within easy reach of the seat.

The steering mechanism for the front wheels 11 of the tractor comprises a transverse bar 26 mounted for sliding movement on the frame of the tractor and having forwardly projecting arms 27 at its opposite ends pivoted to arms 28 which are secured to the upper ends of vertical posts 29 which in turn carry at their lower ends outwardly projecting pivot axles 30 for the wheels 11. Suitable means is provided for reciprocating or for sliding the bar 26, and this means includes a pair of cables 31 secured at 32 to the bar 26 and passing around horizontally arranged sheaves 33 and vertically mounted sheaves 34, the opposite ends of these cables being secured to foot pedals 35 which are pivoted to the tractor frame. As the operator depresses one or the other of the foot pedals 35, the transverse bar 26 will be shifted in one direction or the other, thereby angling the wheels and steering the tractor frame. It is contemplated that this or some similar steering mechanism will be utilized as the machine is propelled through the field to steer the tractor and that the hand wheel 21 will not be ordinarily used for this purpose, as this latter steering means operates too slowly to be used ordinarily for steering the machine.

As clearly illustrated in Fig. 2, the front ends of the side frame members of the tractor have secured thereto angular castings 36 which support the posts 29 and also support various other parts of the mechanism hereinafter described.

In order to support the harvester implement on the frame of the tractor in such a manner that it can be easily adjusted with respect thereto, I have provided a supplemental supporting frame comprising side members 37 and transverse members 38, suitable bracing members 39 also being provided to add to the rigidity of the structure. The supplemental frame is pivotally secured at its rear end by means of pivot pins 40 to the lower ends of vertical standards 41 secured to the side and frame members of the tractor and braced by members 42 with respect thereto. In order to make the supplemental frame easily detachable, cotter pins 43 have been provided to hold the frame in place, but any other suitable securing means may be used if desired. The supplemental frame 37 is made vertically adjustable with respect to the tractor frame and power from the engine 15 mounted on the tractor is utilized to raise and lower this frame.

The operative connections whereby the frame is raised and lowered by this power will next be described.

The main driving shaft 44 for the raising and lowering connections is connected by means of any suitable gearing 45 to the engine shaft 46. The shaft 44 is connected to the gearing at its rear end by means of a suitable spline 45' so that the shaft may be moved longitudinally with respect to this gearing without interfering with the driving of the shaft. A suitable bearing 47 is provided on the tractor frame, the shaft being slidably mounted in this bearing. The shaft 44 is connected at its front end by means of a universal joint 48 to a shaft 49 which in turn is connected by the universal connection 50 to a stub shaft 51 having secured thereto a spur gear 52. The shaft 51 and gear 52 are rotatably mounted in a casting 53 pivotally mounted on pins 54 carried by a vertical standard 55 formed integral with or secured to a casing 56. The casing 56 is provided at one side with a lug 57 which is secured to one of the side frame members 37 of the supplemental frame. The casting 53 as above stated, is pivotally mounted on the pins 54, and in order to normally retain the casting in the position shown in Fig. 4, I have provided a pair of coiled springs 60, arranged on opposite sides of pins 54 and mounted between lugs 61 carried by the casting 53 and lugs 62 carried by the casing 56. The spur gear 52 carried by shaft 51 meshes with a spur gear 63, exactly similar to gear 52 and located at one side thereof. The casing 56 has journaled therein a stub shaft 64 on which is rotatably mounted a spur gear 65 having a central hub 66. The shaft 64 also carries a sleeve 67 having a worm 68 formed thereon, the sleeve 67 and the hub 66 having interlocking portions 69 whereby the sleeve will be driven by the hub 66 and gear 65. The worm 68 meshes with a worm gear 69 keyed to a shaft 70, the shaft 70 passing through suitable journals in the casing 56 and cover plate 71 secured to said casing, and being supported adjacent its opposite ends in bearing members 72 secured to the side members 37 of the supplemental frame. As illustrated in Fig. 2, the shaft 70 extends beyond the bearing members 72 and has secured at its opposite ends chains 73, the opposite ends of these chains being adjustably mounted in bifurcated or forked members 74 secured to the casting 36 carried by the tractor frame.

In order to rock casting 53 on its pivot 54 in such a manner as to place the gear 52 or 63 in mesh with the gear 65, I have secured to one side of said casting a rearwardly projecting arm 75 which is extended to a position in which it may be engaged by the operator's hand. Means is also provided for automatically returning the casting 53 to the position shown in Fig. 4 when the supplemental frame 37 has been moved to its upper limit of adjustment, this means comprising an extension 76 projecting laterally from one side of the casting 53, and this extension being adapted to engage with an overhanging portion 77 of the tractor frame when the supplemental frame has reached its upper limit of movement. In order to automatically throw out of operation the driving connections when the supplemental frame has reached its lower limit of adjustment, I have provided a chain 78 secured at one end to a lug 79 carried by the extension 76, and at its opposite end secured to a downwardly projecting hook 80 carried by the overhanging portion 77 of the tractor frame.

A brief description of the operation of the parts just described will now be given. As above explained, the shaft 49 is driven from the tractor engine and through the universal connection 50 drives the shaft 51 carrying the spur gear 52. Assuming that the shafts 49 and 51 are normally driven by the engine in a direction to raise the frame 37, the operator will raise the arm 75, thereby throwing the gear 52 into mesh with the gear 65 and rotating the worm 68, worm gear 69 and shaft 70. As the shaft 70 is rotated in a direction to raise the frame, the chains 73 will be wound thereon, and as these chains have their effective lengths shortened, the supplemental frame will be raised, the opposite ends of the chains being fixed in the forked members 74 carried by the tractor frame. When the supplemental frame has been adjusted to the proper height, the operator by releasing the arm 75 permits the springs 60 to return the casting 53 to normal position shown in Fig. 4, thereby throwing the gears 52 and 65 out of mesh with each other. Since the driving connection for the shaft 70 is made through worm 68 and worm gear 69, the supplemental frame will be automatically held in the position to which it has been adjusted when the driving connections have been rendered inoperative. Should the operator neglect to release the arm 75 when the supplemental frame has reached its upper limit of adjustment, the extension 76 on the casting 53 will engage with the overhanging portion 77 carried by the tractor frame, thereby automatically returning the casting 53 to its neutral position shown in Fig. 4, and throwing out of operation the gearing connection between the gear 52 and gear 65. When the operator desires to lower the supplemental frame, a downward pressure is exerted on the arm 75 thereby throwing the gear 63 into mesh with the gear 65 and reversing the direction of rotation of the shaft 70 through the intermediate gearing. As in the case of raising the frame when the frame has been adjusted to the desired position, the operator by releasing the arm 75 may retain the frame in the desired position of adjustment. Should the operator by careless operation fail to throw out the driving connections when the frame has reached its lower limit of adjustment, the chain connection between the overhanging portion 77 of the tractor frame and the extension 76 of the casting 53 will automatically return the casting to neutral position, thereby throwing out the driving connections.

In illustrating a practical embodiment of the invention I have chosen to show a shock gathering implement in connection with the tractor and the supplemental frame carried thereby, although as above stated, any other desired form of implement could be substituted for the one shown.

As shown in Fig. 7, the side members 37 of the supplemental frame are formed of channel iron, and these side members have detachably secured to their forward ends forwardly projecting supporting members 81 which are attached to the front ends of the members 37 by means of bolts 82 which pass through suitable apertures in the members 37 and in the supporting members 81. The lower ends of the supporting members 81 have pivotally secured thereto a pair of rearwardly extending members 83 and the rear ends of the members 83 are adjustably supported by means of vertical straps 84 provided adjacent their upper ends with a series of apertures 85. Cotter pins 86 shown in Fig. 7 secure these straps 84 against removal from the rear ends of the members 83. Bolts 87 are provided to secure the upper ends af the straps 84 to laterally projecting brackets 88 carried by the frame members 37 and secured thereto by bolts 82 above mentioned. A transverse pipe 90 forms the main supporting member for the rake tines 89 of the sweep rake or shock gatherer, and this pipe is supported on the members 83 above described, cotter pins 91 or other suitable means being provided on the opposite sides of the pipe to retain the pipe against movement along the members 83. The tines 89 are supported on the pipe 90 in the manner shown in Fig. 2, these tines which are also formed of pipe material passing through diametrically opposed apertures in the pipe and having secured thereon collars 92 which contact with the front surface of the pipe, the rear ends of the tines being firmly held by means of screw threaded caps or bolts 93. It will be seen that this manner of connecting the tines and the supporting pipe is very simple, and that the tines may be easily replaced in case of accident or in case the need arises. The pipe 90 adjacent its outer ends is provided with offset bracket members 94 provided with aligned apertures through which the end tines 95 pass, and these end tines also form a pivotal connection for brackets 96 secured to the inner ends of supplemental rake frame supports 97 (only one being shown). The supports 97 are exactly similar to the supports 90 and are provided with tines 98 secured thereto in the same manner as the tines 89 are secured to pipe 90. Each supplemental rake frame is provided adjacent its outer end with an angular frame member 99 pivoted at 100 to the frame member 97, and at its opposite end pivotally connected with a slidable guiding member 101 mounted on an angle iron 102 rigidly connected with the supporting pipe 90 by means of straps 103. The straps 103 are connected to the angle iron 102 by a common rivet or bolt 104 at their upper ends, and at their lower ends are connected to the tines 89 on the opposite sides of the pipe 90, being disposed between the collars 92 and the pipe on the front side of the pipe, and between the screw threaded caps 93 and the pipe on the rear side of the pipe.

As shown in Fig. 2, each alternate rake tine 89 is provided with these upright straps, and the upright straps 103 and the angle iron 102 secured to their upper ends form the vertical frame of the shock gatherer. If desired, of course, these upright straps 103 may be provided on each of the tines 89.

From the nature of the connection between the supporting members 81 and the members 83, and also between the members 83 and the main supporting pipe 90, and between the members 83 and the brackets 88 carried by the frame members 37, it will be evident that the shock gatherer tines may be tilted to the desired angle with respect to the ground, a latitude of adjustment being provided for by means of the plurality of apertures 85 in the members 84.

From this construction also, it will be evident that the shock gatherer frame may be very easily and very quickly detached from the hinged frame 37 of the tractor, it being merely necessary to remove the bolts 82. It will also be evident that the power drive for the raising and lowering of the hinged frame 37 renders the operation of connecting the implement to the hinged frame of the tractor very simple, since the frame members 37 may be raised or lowered to the desired height to receive the supporting members 81, thereby rendering it unnecessary to lift the shock gatherer frame with respect to the ground in order to position it properly to be connected to the tractor frame. When the shock gatherer is selected as the implement to be used in connection with the tractor, and has been connected thereto, the combined machine is used in the following manner.

Assuming that the tines 89 have been tilted to the desired angle and that the frame has been adjusted to the desired height, the operator throws in the power driving connections between the traction wheel 12 and the engine, and propels the machine to the field where the shocks are located. By means of the steering pedals 35 the combined machine may be easily guided to a position in the rear of the shocks to be gathered, whereupon the tines 89 will be pushed under the shocks until a series of shocks has been positioned on the rear ends of the tines. The tines 89 are usually made long enough to gather at least two sets of shocks, and when the rear set of shocks has been positioned on the rear portion of the tines, the operator by manipulating the arm 75 will raise the tines slightly in order to raise the butts of the shocks from the ground and will then proceed to gather sufficient shocks to fill the forward portions of the tines. After the gatherer frame has been completely filled with shocks, by again manipulating the arm 75 the hinged frame 37 and the shock gatherer frame may be raised to the dotted line position shown in Fig. 1, after which the shocks may be transported to the desired location. The frame 37 and the shock gatherer frame are then again lowered and the tractor is thrown into reverse, whereupon the tines are drawn from beneath the shocks and the shocks are left in the desired location.

When the shock gatherer is to be transported from one location to another, the supplemental frames 97 may be folded to the dotted line position shown in Fig. 3, a hook 105 being provided to engage with a lug 106 carried by the main gatherer frame to retain the supplemental frame in vertical position.

From the above detailed description of the construction and operation of my improved tractor frame with harvester attachment, it will be seen that I have effectively accomplished the objects of the invention set forth, and a further statement of the manner in which these objects have been accomplished is believed to be unnecessary.

While I have in the above description explained one practical embodiment of my invention, and while I have in the drawings illustrated one particular form of harvester implement, and connections between the implement and the tractor frame, it should be distinctly understood that I do not intend to limit myself to the particular structure illustrated, but that this structure has been shown merely for the purpose of illustrating one practical embodiment of the invention. Changes, therefore, in the construction and arrangement of the parts may be made without departing from the spirit and scope of the invention as expressed in the following claims.

I claim:

1. In combination, a motor propelled vehicle, having a frame and a source of power thereon for propelling the vehicle, an implement supported on said frame, means for adjusting said implement to different vertical positions with respect to said frame, operative connections between said source of power and said adjusting means, and means for automatically disconnecting said adjusting means from said source of power when said implement has been raised or lowered to a predetermined position.

2. In combination, a motor propelled vehicle having a frame and a source of power thereon for propelling the vehicle, an implement adjustably supported on said frame, means for raising and lowering said implement with respect to said frame, operative connections between said source of power and said raising and lowering means, means for automatically disconnecting said raising and lowering means from said source of power when said implement has been raised to a predetermined height or lowered to a predetermined position, and means for engaging or disengaging said raising and lowering means from said source of power at any desired height of the implement.

3. In combination, a vehicle frame having a source of power thereon, a supplemental frame pivoted at its rear end to the vehicle frame, means operated from said source of power for adjusting the supplemental frame on its pivot, and means adapting the front end of the supplemental frame for detachable connection to an implement.

4. In combination, a vehicle frame having a source of power thereon for propelling the vehicle, a supplemental frame pivotally connected with said vehicle frame, means for raising and lowering said supplemental frame on its pivot, operative connections between said last-named means and said source of power, and means for automatically disconnecting said raising and lowering means from said source of power when said supplemental frame has been raised to a predetermined height or lowered to a predetermined position.

5. In combination, a vehicle frame, a source of power thereon, means supporting the frame and driven from the source of power for propelling the frame, a supplemental frame pivotally connected to said vehicle frame, means for adjusting said supplemental frame on its pivot, operative connections between said adjusting means and said source of power, means for maintaining the supplemental frame in any position of adjustment, and means for detachably connecting a harvester implement to said supplemental frame.

6. In combination, a frame having a source of power thereon, a supplemental frame pivotally connected to said first-named frame, means for raising and lowering said supplemental frame, operative connections between said raising and lowering means and said source of power, a harvester implement having supporting members projecting therefrom, and means for adjustably connecting said supporting members to said supplemental frame.

7. In combination, a frame, a supplemental frame pivotally connected thereto, a shock gatherer frame including a main supporting pipe, a plurality of members extending transversely with respect to said pipe and secured thereto, and means for securing the opposite ends of said last-named members to said supplemental frame.

8. In combination, a frame, a supplemental frame pivotally connected thereto, a shock gatherer having a main supporting pipe, gathering tines secured thereto and extending inwardly therefrom, members secured to said pipe and extending forwardly and rearwardly therefrom, supporting members secured to said supplemental frame and to the forward ends of said first-named members, and means for adjustably securing the rear ends of said first-named members to said supplemental frame.

9. In combination, a shock gatherer frame including in combination, a main supporting pipe, a plurality of shock gatherer tines passing through said pipe and secured thereto, and vertical frame members carried by said tines and extending upwardly from said main supporting pipe, and shock gatherer supporting members secured to said pipe and extending rearwardly therefrom.

10. In combination, a vehicle frame, a supplemental frame pivotally connected thereto to swing in a vertical plane, means on the supplemental frame for supporting a harvesting implement, a shaft carried by one of said frames, reversible gearing carried by the other of said frames, operative connections between said shaft and said gearing and driving connections for said reversible gearing whereby said supplemental frame may be vertically adjusted on its pivot.

11. In combination, a vehicle frame, a supplemental frame pivotally connected thereto, an agricultural implement supported on the supplemental frame, means for raising and lowering said supplemental frame about its pivotal connection including a casing secured to said supplemental frame, a plurality of gears carried by said casing, and means for driving said gears in either direction of rotation.

12. In combination, a vehicle frame, a supplemental frame pivotally connected thereto, an agricultural implement carried by the supplemental frame, means for raising and lowering said supplemental frame including a casing secured to said supplemental frame, a shaft secured to said supplemental frame, gearing carried by said casing and operatively connected to said shaft, means for driving said gearing in either direction, and flexible members secured to said shaft and to said vehicle frame.

13. In combination, a vehicle frame, a supplemental frame pivotally connected thereto, an agricultural implement carried by the supplemental frame, means for raising and lowering said supplemental frame including a casing secured to said supplemental frame, a plurality of gears carried by said casing, a shaft carried by said supplemental frame and operatively connected to said gears, a casing pivotally connected to said first-named casing, and a plurality of gears carried by said last-named casing and adapted to be operatively connected to the gearing of said first-named casing.

14. In combination, a vehicle frame, a supplemental frame pivotally connected thereto, an agricultural implement carried by the supplemental frame, means for raising and lowering said supplemental frame including a casing, gearing carried by said casing, a second casing pivotally connected to said first-named casing, gearing carried by said second-named casing and adapted to mesh with the gearing in said first-named casing, and means for automatically disconnecting the gearing in said first-named casing from the gearing in said second-named casing when said supplemental frame has reached a predetermined position of adjustment.

15. In combination, a frame, a supplemental frame pivotally connected thereto, an agricultural implement carried by the supplemental frame, means for adjusting said supplemental frame upon said main frame including a casing carried by said supplemental frame, a second casing pivotally connected to said first-named casing, gearing carried by said first-named casing, gearing carried by said second-named casing and adapted to mesh with the gearing of said first-named casing, and means carried by said second-named casing and adapted to engage with a portion of said first-named frame when the supplemental frame has reached a predetermined position of adjustment, thereby disconnecting the gearing of said second-named casing from the gearing of said first-named casing.

In testimony whereof I affix my signature.

CHARLES PEARSON.